Sept. 5, 1967
G. F. QUAYLE
3,339,363
HYDROSTATIC TRANSMISSION CONTROL
Filed Oct. 21, 1965
4 Sheets-Sheet 4
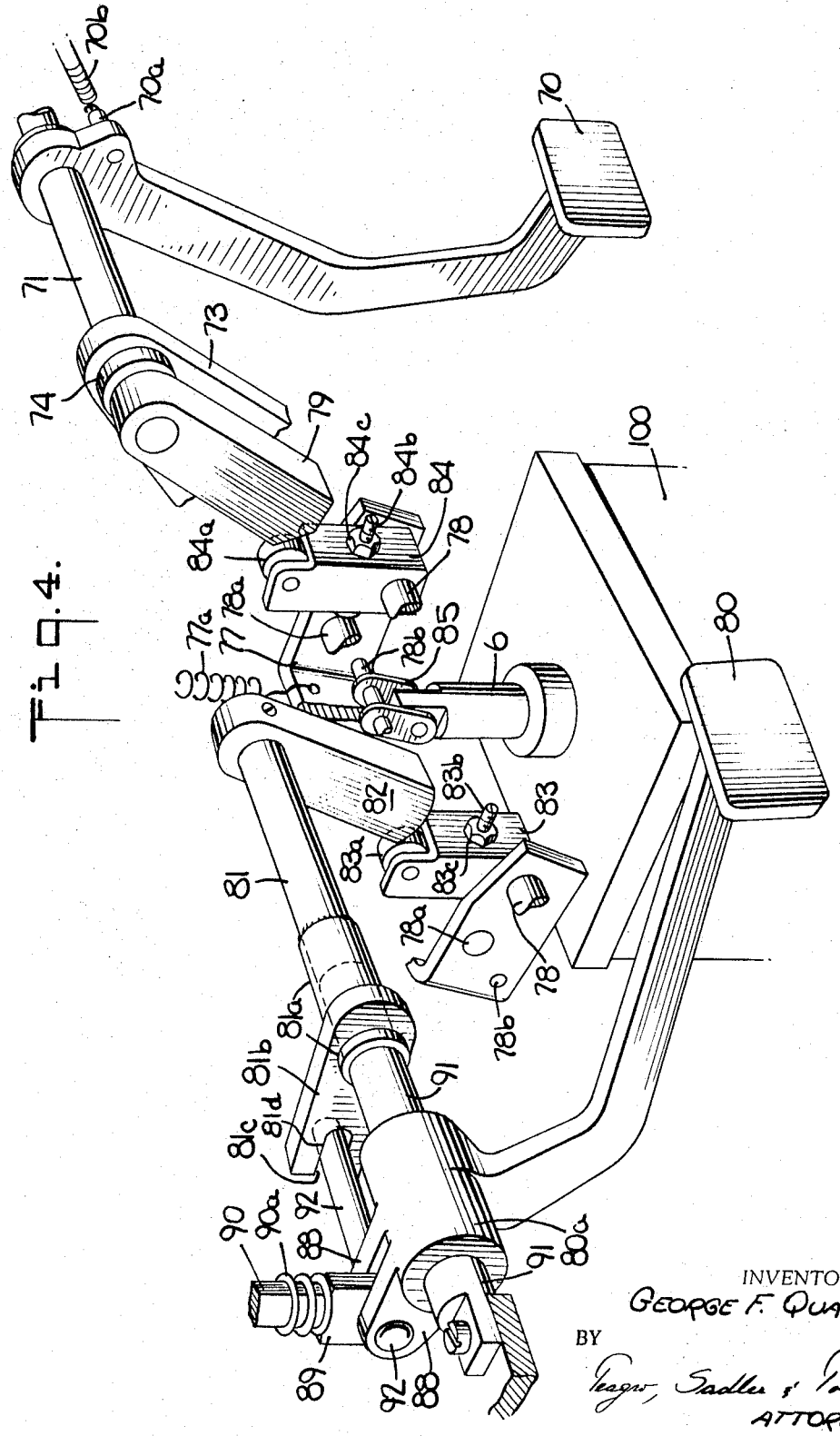
INVENTOR.
GEORGE F. QUAYLE
BY
Teagno, Sadler & Toddy
ATTORNEY ः
United States Patent Office 3,339,363
Patented Sept. 5, 1967

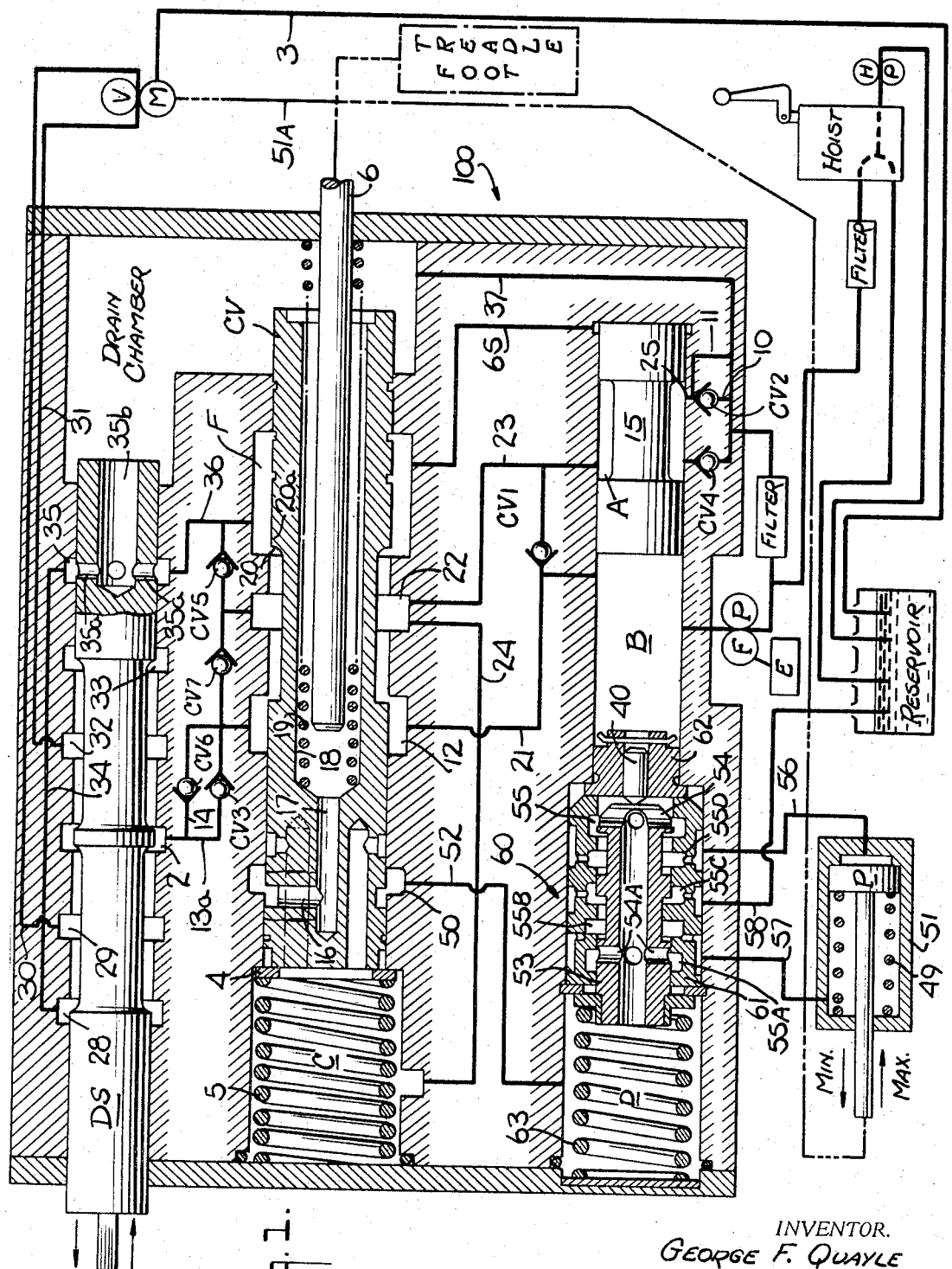

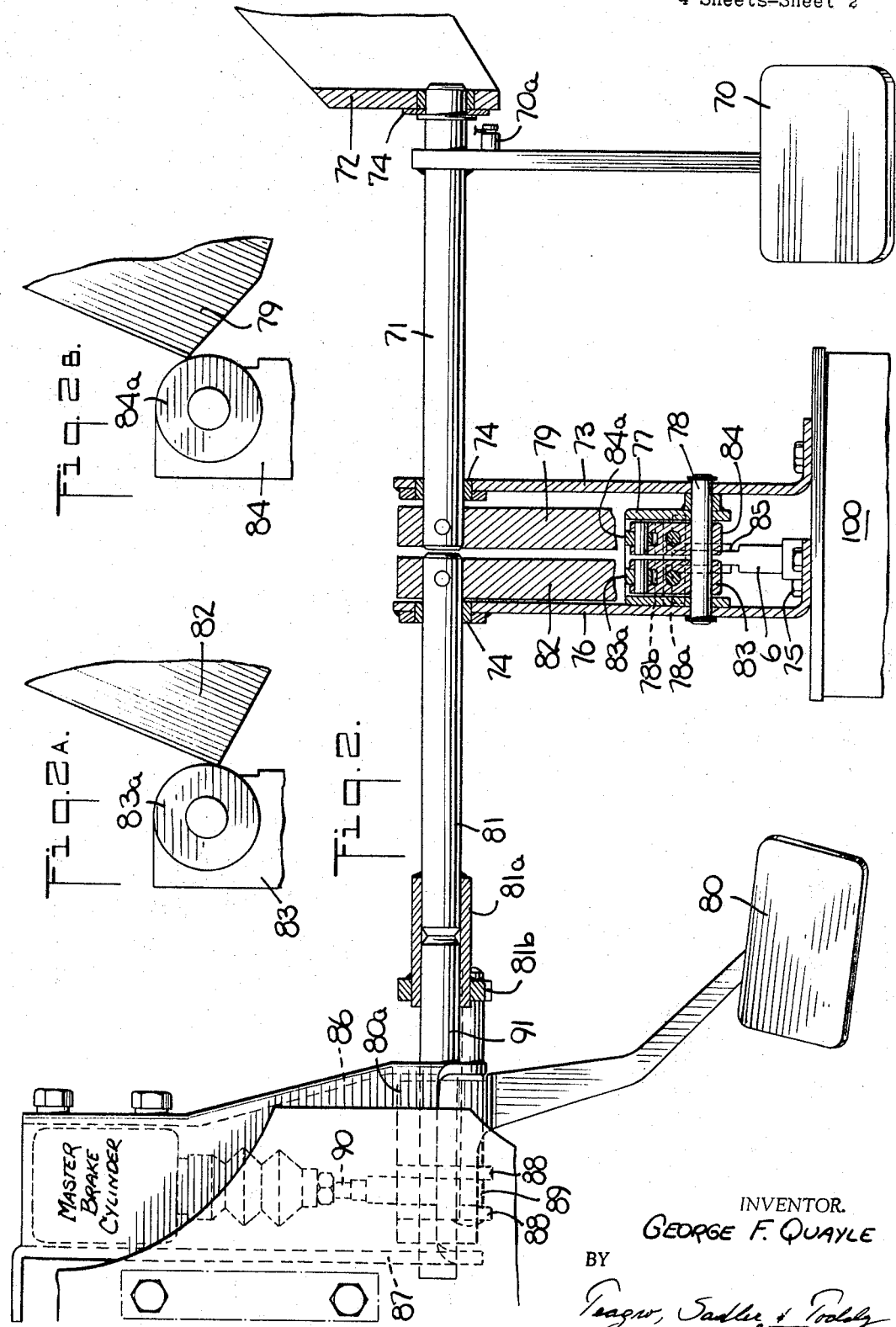

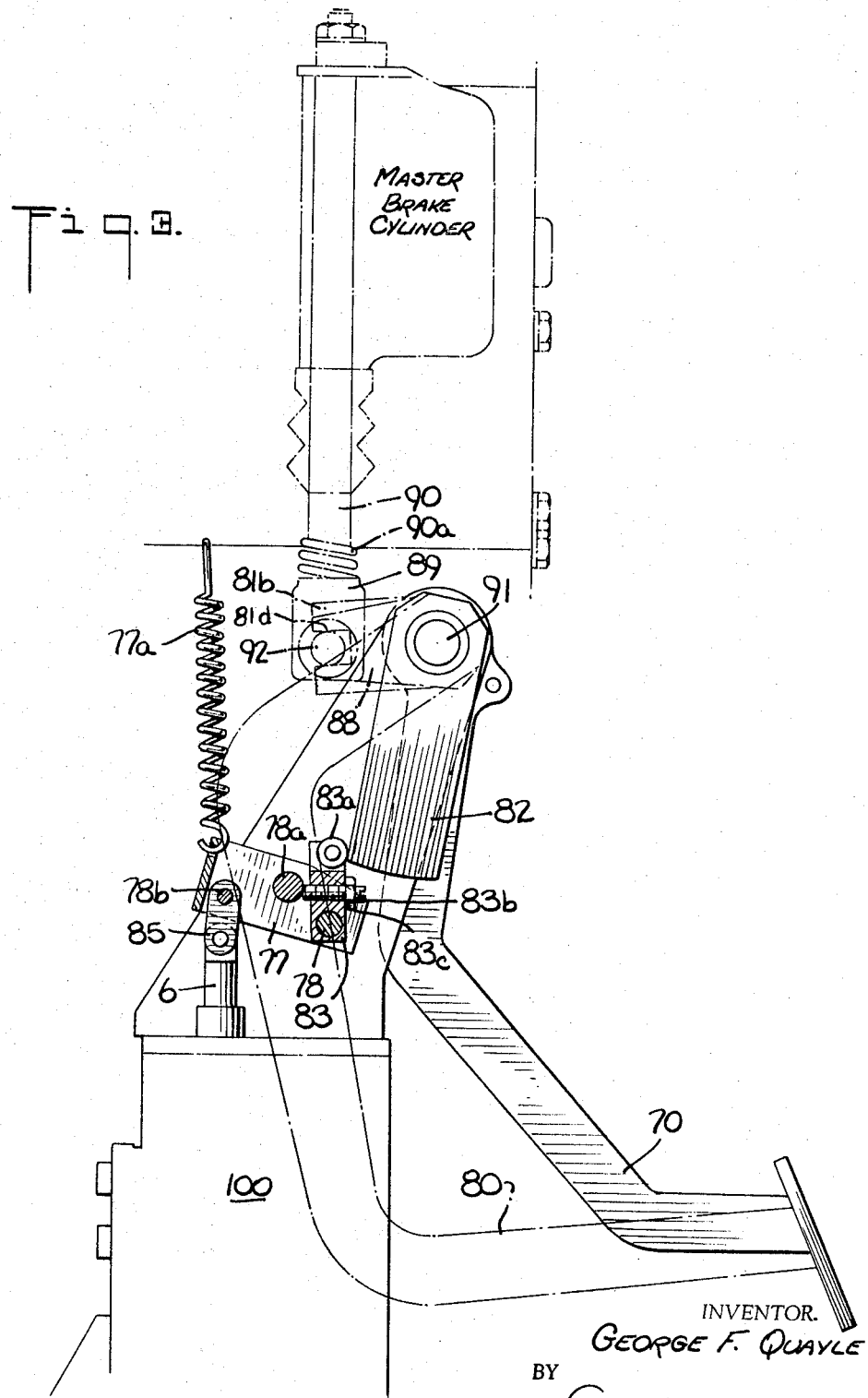

3,339,363
HYDROSTATIC TRANSMISSION CONTROL
George F. Quayle, Jenkintown, Pa., assignor to Eaton Yale & Towne Inc., a corporation of Ohio
Filed Oct. 21, 1965, Ser. No. 499,615
17 Claims. (Cl. 60—19)

ABSTRACT OF THE DISCLOSURE

An "inching" control for a hydrostatic transmission of an industrial truck comprising an inching pedal, an inching cam, a cam follower responsive to movements of said cam, said cam follower operatively connected to the hydrostatic transmission wherein the industrial truck can be delicately controlled in a forward or reverse motion during maneuvering movements of the truck.

This invention relates to a hydrostatic drive, particularly adapted for an industrial truck. More particularly, this invention relates to a control for a hydrostatic transmission as shown in copending application Ser. No. 452,816, filed May 3, 1965, and entitled, "Hydrostatic Transmission."

The basic concept of this earlier application resides in the utilization of a control means responsive to the pressure developed by an engine drive hydraulic pump to effect the drive of the hydraulic pump to effect the drive of the hydraulic motor. Thus, it can readily be seen that within certain limits, the engine that drives the hydraulic pump controls the actuation of the hydraulic motor by the hydraulic pump, merely through the speed control of the engine. This actuation does not, however, begin until after the engine speed has been increased from an idling speed and a predetermined pressure has been established in the hydraulic actuating system. Further, through the same control concept, I have provided a means whereby increases in engine speeds will naturally bring about faster and faster operation of the hydraulic motor, subject to the particular controls as is set forth in my aforementioned application.

A purpose of the mechanism disclosed herein is to permit high speed operation of the engine of an industrial truck so that considerable fluid is available to the industrial lifting truck mechanism while at the same time, the fluid supplied to the hydraulic motor is controlled so that the truck moves at a very slow inching speed to permit manipulation of the load. Thus the operator can keep one foot on the accelerator and the other foot on the inching pedal to control the speed of the truck. It is to be noted that there will be no actuation of the master brake cylinder through operation of the inching pedal. In other words, the operator will speed the engine and then will, through proper manipulation of the inching pedal, overcome the action of the fluid pressure developed by the engine driven pump tending to move the truck. By doing this rather delicately, the truck engine will inch the truck while at the same time considerable pressure will be developed in the lifting system so as to obtain a fast lift.

The inventive concept of my contribution also includes a novel brake pedal control. When the brake pedal is operated, through its actuating cam, it will very rapidly depress the speed spool through movement of the brake rod thereby immediately shutting off the hydrostatic pressure to the motor and also utilizing the hydraulic motor as a brake. At the same time, an extension of the pedal mechanism will actuate the master cylinder hydraulic brake of the truck and thereby provide, in effect, a dual braking system for the truck.

It has been found highly desirable in the industrial trucks of this particular class that frequently it is necessary to hoist the load at a high rate of speed and yet provide an inching control for the truck whereby the operator may maneuver the truck in narrow aisles, approach the rear of a transfer truck or any other type of maneuver wherein a considerable amount of control and care must be exercised in handling the truck and its load. It becomes obvious that such a feature would be highly desirable inasmuch as it would materially reduce the time required per load and thereby increase the number of loads per truck per given unit of time.

It has been found that with the control system set forth hereinbelow, the operator may speed the engine with one foot on the accelerator and simultaneously inch the truck into a desired position by operation of the inching pedal with the other foot. When it is desired to bring the truck to a complete stop, the brake pedal is depressed and through the linkage of the unit simultaneously actuates the brake rod to cut off the supply of fluid to the hydraulic motor and also closes off the return from the hydraulic motor thus building up a back pressure in the hydraulic system and thereby utilizing the hydraulic motor as a brake. In addition, an extension operably connected to the brake pedal actuates the master cylinder of the hydraulic brake system thus supplying hydraulic fluid under pressure to the individual brake wheel cylinders and providing a rapid or dynamic braking action of the truck. By depressing the brake pedal, the speed spool is abruptly forced into its braking position before the clearances are taken up in the brake cylinders of the individual brakes. Thus, I have provided for a pre-set degree of hydraulic braking determined by the setting of the brake valve in the hydraulic controller. As an additional advantage of my concept, it can be seen that due to the fact that hydrostatic braking precedes the use of the brake linings in the wheels, brake wear in trucks equipped with my system will be markedly reduced.

Therefore, it can be readily seen that my concept provides two brake pedals. One brake pedal brings about the dynamic braking of the truck through the use of the hydraulic motor as a braking device and also applies the wheel brakes. The other "brake pedal" functions to effectively cut off the supply of hydraulic fluid to the motor and also closes off the return line from the hydraulic motor thus bringing about the "dynamic braking" described supra.

I have thus outlined rather broadly the more important and salient features of my invention in order that the detailed description that follows may be better understood, and in order that my contribution to the art may be more fully appreciated. There are, of course, additional ancillary features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings:

FIG. 1 shows diagrammatically the driving and braking system of a truck utilizing my novel controls.

FIG. 2 shows further details of the foot controls.

FIGS. 2a and 2b show details of the cam configurations.

FIG. 3 shows in a side elevational view, details of the brake pedal as related to the master cylinder and the motor control valve block.

FIG. 4 illustrates in detail the relationship of the inching pedal and brake pedal to their respective cams and the motor control valve block.

Referring now more particularly to FIG. 1 of the drawings, there is shown a diagrammatic arrangement of the overall hydraulic system of the propulsion system for an industrial truck wherein my novel braking and inching concept is used.

FIG. 1 illustrates a hydraulic system for driving a variable motor VM to propel an industrial truck. The system consists of a closed hydraulic circuit which utilizes a fixed displacement pump FP as its source of hydraulic fluid pressure. I have shown fixed displacement pump FP as operably connected to and driven by engine E and having an output which is directly proportional to the speed of engine E. Since this is a fixed displacement pump, its output can readily be controlled by controlling the speed of engine E. Fixed displacement pump FP is shown as taking suction from a reservoir via a filter and discharging into chamber B of valve block 100. Due to the position of valves 15 and 60 the fluid exits from chamber B via passage 21 and discharges into groove 12. Control valve CV would normally be to right of the position shown whereby fluid under pressure will flow by check valve CV3, through line 13a and then into groove 2. Depending upon the position of direction spool DS, fluid under pressure will then enter either groove 29 or 32.

Assuming direction spool DS is moved to the left and the pressure within the system has reached a proper operating level, then pressure fluid will enter groove 32 and flow through passage 31 to the variable motor VM. I have provided a line 3 which is an outlet for any leakage of fluid from the motor casing and returns it to the reservoir. Since fluid is supplied under high pressure to the variable motor VM via line 31, thence low pressure return fluid is transmitted via line 30 into groove 29 which communicates with groove 28. Passage 34 communicates with groove 28 permitting fluid to flow therefrom into groove 35. Keeping in mind the fact that direction spool DS has been moved to the left, passages 35a in direction spool DS will be out of communicaiton with groove 35. Fluid will then flow through passage 36 into chamber F which is an enlarged area adjacent the right end of the bore in which control valve CV reciprocates.

It can be seen that fluid can emerge from chamber F through the left end thereof into the bore and thence into groove 22. However, this is only possible when control valve CV is in the position shown in FIG. 1. Fluid may not exit from chamber F through passage 65 due to the position of shuttle valve 15 and the fact that the pressure in line 65 is low pressure fluid whereas the fluid in chamber B is high pressure and is acting on the end face of shuttle valve 15. It should also be noted that control valve CV is in a position which is substantially to the right of that shown in FIG. 1. The position of control valve CV is sufficiently to the right, exposing groove 50, to permit fluid in chamber C to enter groove 50 and flow through passage 52 into chamber D permitting it to act through valve 60 and piston P to increase or decrease the displacement of the variable motor VM. I have in much more detail set forth the operation of the control valves of this system in my copending application previously referred to above. For purposes of setting forth the inventive concept of my present invention, it is sufficient to indicate that movement of control valve CV to the left will cut off the flow of return fluid from the motor VM to passage 24, thus producing a braking action within the motor. Movement of control valve CV to the left is effected through brake rod 6 which is operably connected to the foot treadle as shown in the diagrammatic illustration of FIG. 1. It can be seen that control valve CV is biased to the right by spring 5 and also urged to the right by fluid pressure in chamber C which is acting on the end face of control valve CV. Spring 19 acts within bore 18 of control valve CV urging the control valve CV to the left. Thus it can also be seen that movement of brake rod 6 to the left will move control valve CV to the left thus cutting off the supply of fluid to and return of fluid from the variable motor VM to thereby effect a braking action of the industrial truck. I have provided control valve CV with a metering notch 20a which permits a gradual cutting off of the return fluid from the variable motor VM. Thus, I provide for a relatively smooth braking action. By properly manipulating the foot pedal which actuates brake rod 6 with one foot, while simultaneously accelerating the engine with the other foot, "inching" of the truck is possible, thereby saving on the amount of time required per lift and correspondingly reducing the total overall time required to perform a given amount of work.

Referring now to FIG. 2, I illustrate the unique pedal arrangement which permits me to carry out my invention in the manner set forth hereinabove. I show an inching pedal 70 that is fixedly secured to shaft 71 and rotates therewith. Shaft 71 is supported at opposite ends by means of brackets 72 and 73, each of which receives a bearing 74 within which shaft 71 rotates. Bracket 72 is secured to another fixed member of the truck while bracket 73 is secured to valve block 100 by bolts 75 or any other suitable fastening means. Spaced apart from bracket 73 is another bracket 76 of similar configuration which is also shown as secured to valve block 100 by bolts 75. The outer end of bracket 76 is also provided with a bearing 74 which receives shaft 81. Shafts 71 and 81 being in alignment with each other.

Rotatably mounted between brackets 73 and 76 is a yoke member 77 which pivots about yoke shaft 78. Yoke shaft 78 is received in aligned holes in brackets 73 and 76. Yoke member 77 can be actuated by means of either inching cam 79 or brake cam 82. Cam member 79 is fixedly secured to shaft 71 and rotates therewith, while cam member 82 is fixedly secured to shaft 81 and rotates therewith. Within yoke member 77 is shaft 78a which has opposite ends received in the opposite walls of yoke member 77. Movable on shaft 78a are a pair of cam followers 83 and 84 which are provided with rollers 83a and 84a, respectively. Also within yoke member 77 is another shaft or link pin 78b which has opposite ends received in the opposite walls of yoke member 77. Fixedly secured to link pin 78b is a short connecting link 85 which has its other end secured to brake rod 6 by a pin or other suitable means. The function of inching cam 79 and braking cam 82 together with the manner in which they co-operate with cam followers 83, 84 and yoke member 77 will be explained more fully hereinafter with regard to the subsequent figures.

I have also provided shaft 81 with a sleeve member 81a that is securely mounted thereto at its opposite end from that portion received in bearing 74. Attached to one end of sleeve 81a is lever member 81b. Received within the open end of sleeve 81a is the free end of brake pedal shaft 91 which extends through brackets 86 and 87. The other end of brake pedal shaft 91 being fixedly secured to bracket 87 by means of a bolt or other suitable means.

Rotatably mounted on brake pedal shaft 91 is collar portion 80a of the brake pedal 80 which is directly connected to the master brake cylinder through clevis 88 which is an integral extension of collar portion 80a. Received by clevis 88 is member 89 which is operably connected to the piston rod 90 of the master brake cylinder by means of brake pedal pin 92. Brake pedal pin 92 extends axially and is received by the slot 81c of lever 81b and held in place by a cotter pin. It can be seen that I have provided a somewhat elaborate joint connection between the brake pedal 80 and shaft 81. The purpose of this type of connection is to permit relative movement of the brake pedal 80 with respect to valve 100. If there is any vibration or movement of the shaft 81 in an axial direction, it will not be transmitted to the brake pedal 80.

As is apparent, depressing brake pedal 80 will bring about actuation of the master brake cylinder through its direct connection therewith. Simultaneously, clevis 88 rotates along with brake pedal 80 on shaft 91 and, through the means of brake pedal pin 92 which passes through clevis 88 and is received in slot 81c of lever 81b, will bring about rotation of shaft 81 which in turn actuates brake cam 82. I have provided slot 81c with clearance at 81d which permits a predetermined amount of lost motion. Upon actuation of brake pedal 80, shaft 92 through contact with lever 81b and shaft 81 actuates brake rod 6 prior to pressure development by the master brake. Upon the release of brake pedal 80, due to this clearance 81d, the master brake is first released and after the clearance is taken up. then the lever 81b will be contacted by shaft 92 to retract rod 6. Thus it can be seen that in actuating the brake pedal, the valve 100 is actuated prior to the action of the wheel brakes and also when releasing the brake pedal 80, the wheel brakes are released first whereby I have provided means for considerably reducing the amount of brake lining wear when the brakes are applied and also in the releasing thereof. Due to the various clearances and lost motion within hydraulic brake system at the master brake cylinder and also at the individual wheel cylinders, it has been found, in fact, the braking action effected by the hydraulic motor VM precedes the braking of the individual wheel brakes. Thus, there is a minimum amount of wearing of the brake linings.

FIGS. 2a and 2b are detailed views of the braking cam 82 and inching cam 79 illustrating the manner in which they are brought into contact with their respective cam rollers. It is to be noted that brake cam 82 when rotated, due to its high cam ratio, will bring about a more rapid and greater degree of travel of the cam follower 83 than inching cam 79. Likewise, inching cam 79, due to its low cam ratio and reduced contact angle with its respective roller will bring about a lesser amount of travel of brake rod 6 than would braking cam 82 for the same amount of cam travel. With the configuration of the brake cam 82 and inching cam 79 in mind, it becomes obvious that actuation of brake rod 6 through braking cam 82 will produce a quick and abrupt stop of the vehicle whereas the actuation of brake rod 6 through inching cam 79 will produce a smooth and more gradual stop of the vehicle.

In FIG. 3 I have shown a side elevational view of the brake and inching pedal arrangement with a section taken through yoke member 77. This sectional view clearly discloses the relative position of the cam follower 83, its cam roller 83a and braking cam 82. Additionally, there is illustrated an adjusting screw 83b and its locking nut 83c. It can be seen that by turning in on adjusting screw 83b the yoke member 77 can be made increasingly sensitive to the movement of cam member 82. Likewise, by retracting the adjusting screw 83b, the yoke member 77 becomes less sensitive to the camming action of cam member 82. After the desired adjustment is made to the adjusting screw 83b, its position can be secured by tightening the locking nut 83c. Although this view shows only adjusting screw 83b and locking nut 83c for cam follower 83, there is a similar arrangement with respect to cam follower 84 for the inching cam 79.

There is also shown in FIG. 3 a spring member 77a which is secured at one end to yoke member 77 and fastened to a stationary part of the truck at its opposite end. It can be seen that spring member 77a resiliently loads yoke member 77 in a direction opposite to that urged by the action of camming members 79 and 82. Master cylinder piston 90 is also provided with a spring member 90a which urges the piston 90 in a direction opposite to that urged by clevis 88 when the braking pedal 80 is depressed.

Referring now to FIG. 4 I have further illustrated the brake and inching pedal arrangement of my improved control system. Portions of the shafts and various members have been broken at different points to permit the best illustration of the various components. This view shows all the basic components of the invention in their relative positions thereby presenting a concise picture as to the operation thereof. Additionally, I show a spring member 70b which is secured at one end to pin 70a. Thus, inching pedal 70 is resiliently loaded in a direction which is opposite to the force imparted to inching pedal 70 when it is depressed by the operator's foot.

*Summary of operation*

Assuming the engine E has been operating and there is sufficient hydraulic pressure within the system, and the direction spool DS has been moved to the proper direction whereby forward movement of the truck is achieved. The truck has now arrived at a desired destination to pick up a load. As the truck engages the load, the operator with one foot on the accelerator can depress the accelerator to speed the engine and thereby provide a considerable amount of hydraulic fluid to give a fast lift. However, as the engine was accelerated to provide additional fluid for the lift ram, the hydraulic pump which supplies hydraulic fluid to the variable motor VM was also accelerated since it is directly connected to the engine E.

Thus, the operator can, by proper manipulation of the inching pedal 70 control the speed of the truck. By depressing the inching pedal 70 through the shaft 71, cam 79, follower 84 and yoke member 77 the brake rod 6 is actuated which in turn will bring about movement of the control valve CV. It is to be noted that the actuation of control valve CV performs two very important functions which effectively contribute to my novel control concept. Firstly, as the control valve CV is moved to the left, as viewed in FIG. 1, sufficiently to uncover groove 12, it permits fluid pressure to come into communication with passage 24. Thus, the fluid is diverted from the motor VM. Secondly, as this occurs, the shoulder 20 of control valve CV is also moved to the left, whereby the return fluid from the motor VM has its return passage 36 closed off thus bringing about a "braking action" through motor VM. As the inching pedal 70 is released, the control valve CV returns to its original position and the full flow of hydraulic fluid is again transmitted to the motor VM.

Assuming now that the load has been lifted, carried to its desired destination, unloaded from the truck and it is now desired to bring the truck to a halt. By depressing the brake pedal 80, the master brake cylinder is actuated and through the collar portion 80a of brake pedal 80 the brake pedal pin 92 is pivoted. Since the opposite end of brake pedal pin 92 is received in slot 81c of lever 81b rotation of shaft 81 is thereby effected. It can be seen that rotation of shaft 81 will bring about actuation of brake rod 6 through braking cam 82. As pointed out previously, the sequence of the braking operation would lead one to believe that the wheel brakes of the truck are actuated first through actuation of the master cylinder. However, it has been shown through many tests, that due to clearances and lost motion of the master cylinder and wheel cylinders, the actuation of the brake rod 6 is effective to bring about a braking action through the use of the motor VM prior to the action of the individual wheel brakes. Thus, it can be seen that my concept also permits a considerable saving in reduced amount of wear to the wheel brake linings.

From the preceding description it can be seen that I have provided a novel control system which provides exceptional inching control of the truck while maneuvering at close quarters and it additionally provides a highly desirable braking action when it is desired to stop the vehicle whether it be for an emergency or otherwise. While an embodiment of the invention has been shown and described, it will be appreciated that this is for the purpose of illustration and that changes and modifications may be made therein without departing from the spirit and scope of the invention.

I now claim:

1. In a combination of the class described, an engine driven pump, a hydraulic motor, a hydraulic control for said motor, means whereby the acceleration of said engine effects the development of pressure by said pump to actuate said hydraulic control to effect operation of said motor, manually operated cam means to effect movement of said hydraulic control in a direction reverse to its actuation hydraulically whereby to slow said motor while said engine is rotating at a speed normally to drive said motor at a relatively high speed, a pair of treadles for actuating said cam means, the cam means operated by one treadle being shaped to impart gradual movement to said hydraulic control while the other cam means operated by the other treadle is shaped to impart sharp swift movement to the cam means operated thereby, and a master brake cylinder operated also by said other treadle.

2. In a truck of the class described, an engine driven pump, a hydraulic motor for driving said truck, a hydraulic control for said motor, means whereby the acceleration of said engine effects the development of pressure by said pump to actuate said hydraulic control to effect operation of said motor and driving of said truck, manually operated cam means to effect movement of said hydraulic control in a direction reverse to its actuation hydraulically whereby to slow said motor while said engine is rotating at a speed normally to drive said motor at a relatively high speed, and thereafter to effect braking of said truck by placing the motor in a closed hydraulic braking circuit through controlled movement of said hydraulic control, a pair of treadles for actuating said cam means, the cam means operated by one treadle being shaped to impart gradual movement to said hydraulic control while the other cam means operated by the other treadle imparts sharp swift movement to the cam means operated thereby, and a master brake cylinder operated also by said other treadle.

3. In a vehicle transmission of the class having an engine driven pump, a hydraulic motor, a hydraulic control for said motor, means whereby the acceleration of said engine effects the development of pressure by said pump to actuate said hydraulic control and to effect operation of said motor and driving of said vehicle, operating means to effect movement of said hydraulic control in a direction reverse to its actuation hydraulically whereby to slow said motor while said engine is rotating at a speed normally to drive said motor and vehicle at a relatively high speed, means whereby continued operation of said operating means moves said hydraulic control to place the motor in a closed hydraulic braking circuit to brake the vehicle, a pair of treadles, means operated by one treadle to impart gradual movement to said hydraulic control, means operated by the other treadle to impart relatively swifter movement to the said hydraulic control, and a master brake cylinder for said vehicle also operated by said other treadle.

4. In combination of the class described, an engine driven pump, a hydraulic motor, a control for said motor, manually operated cam means to effect movement of said control in a direction to slow said motor while said engine is rotating at a speed normally to drive said motor at a relatively high speed, a pair of treadles for actuating said cam means, the cam means operated by one treadle being shaped to impart gradual movement to said control while the other cam means operated by the other treadle is shaped to impart sharp swift movement to the control operated thereby, and a master brake cylinder operated also by said other treadle.

5. In an industrial truck of the class described, the combination of an engine, a closed hydraulic circuit including a hydraulic pump driven by said engine, a hydraulic motor, a hydraulic control for said motor, means whereby the actuation of said engine effects the development of pressure by said pump to actuate said hydraulic control to effect operation of said motor, manually operable cam means to effect movement of said hydraulic control in a direction reverse to its actuation hydraulically whereby pressure fluid to said motor is diverted by one of said cam means thus slowing down the motor and simultaneously cutting off the exhaust of said motor thus having said motor act as a brake and continued actuation of said cam means brings about the hydraulic actuation of the wheel brakes thereby providing for a significant saving of wheel brake lining wear, the other of said cam means providing for identical movements of said hydraulic control without the actuation of the hydraulic wheel brakes.

6. In an industrial truck of the class described, the combination of an engine, a closed hydraulic circuit including a hydraulic pump driven by said engine, a hydraulic motor, a hydraulic control for said motor, means whereby the actuation of said engine effects the development of pressure by said pump to actuate said hydraulic control to effect operation of said motor, first and second means for effecting movement of said hydraulic control in a direction opposite to its actuation hydraulically whereby actuation of said first means reduces the speed of said motor by diverting the supply of fluid to said motor and simultaneously preventing the return of exhaust fluid from said motor thereby having said motor function as a brake to further reduce the speed of said motor and continued actuation of said first means will actuate the hydraulic wheel brakes, said second means providing for identical movement of said hydraulic control without the actuation of said wheel brakes.

7. In an industrial truck of the class described in claim 6, wherein said first means for effecting movement of said hydraulic control comprises a brake pedal operably mounted on a shaft, said brake pedal operably connected to said wheel brakes through a master cylinder, a pin operably connecting said pedal to a lever member having a slot therein, said slot being provided with a predetermined amount of lost motion when imparting rotation to a shaft which is connected thereto, a brake cam mounted on the other end of said shaft, and cam follower means mounted on a yoke member which effects movement of said hydraulic control in response to movements of said brake pedal.

8. In an industrial truck of the class described in claim 6, wherein said second means for effecting movement of said hydraulic control comprises an inching pedal rotatably mounted at one end of a shaft, an inching cam mounted on the other end of the shaft for rotation therewith, and cam follower means mounted on a yoke member effects movement of said hydraulic control in response to movements of said inching pedal.

9. In a device of the character described in claim 7 wherein said brake cam is provided with a cam angle which will produce rapid rotation of said cam follower whereby the hydraulic control is abruptly forced into braking position before the wheel brake cylinders are actuated.

10. In a device of the character described in claim 8 wherein said inching cam is provided with a cam angle which will produce relatively slow rotation of said cam follower whereby the hydraulic control is gently moved into its position of dynamic braking in which the hydraulic control is moved in a direction reverse to its actuation hydraulically.

11. In an industrial truck of the class described, the combination of an engine, a closed hydraulic circuit including a hydraulic pump driven by said engine, a hydraulic motor and a hydraulic control for said motor, first and second mechanical means for effecting movement of said hydraulic control, said first mechanical means including a brake pedal rotatably secured on a mounting shaft having one end which is fixedly secured to said truck, said brake pedal having a collar portion with an integral clevis extending therefrom, a pin extending through said clevis portion, a second shaft in axial alignment with said mounting shaft and having a sleeve portion thereon for receiving the other end of said mounting shaft, a lever arm having a slot therein fixedly mounted said second shaft, said pin received in said slot and imparting rotation to said second shaft in response to actuation of said brake pedal, said second shaft imparting movement to a brake cam thus effecting movement of said hydraulic control, said first and second shaft permiting relative vibrational movement between said hydraulic control and said brake pedal without the vibration of one affecting the other, said first mechanical means also providing for actuation of the wheel brakes when said brake pedal is depressed.

12. In a device of the character described in claim 11 wherein said second mechanical means for effecting movement of said hydraulic control comprises an inching pedal fixedly secured to one end of a shaft for rotation therewith, an inching cam fixedly secured to the other end of said shaft, a cam follower mounted on a yoke member and responsive to movements of said cam, said inching cam having a cam angle which will produce a relatively slow rotation of said cam follower in response to movements of said inching pedal whereby movement of said truck can be delicately controlled in forward or reverse motion during maneuvering movements of the truck.

13. In an industrial truck having a hydrostatic transmission of the class described, the improvement comprising an engine, a closed hydraulic circuit including a hydraulic pump directly driven by said engine, a hydraulic motor receiving fluid under pressure from said pump, a hydraulic control operably mounted in said closed circuit intermediate said pump and said motor, a brake rod mounted for axial movement within said hydraulic control, first means for actuating said brake rod whereby the suply of hydraulic fluid to said motor is diverted and the return of exhaust fluid from said motor is prevented whereby said motor functions as a dynamic brake to slow said truck, the braking action of said first means being applied and released by the actuation and releasing of said first means, and second means being independent of said first means for actuating said brake rod whereby the supply of hydraulic fluid to said motor is diverted and and the return of exhaust fluid is prevented, additionally, continued actuation of said second means provides for the subsequent activation of the wheel brakes of said truck.

14. In an industrial truck having a hydrostatic transmission of the type described in claim 13 wherein said first means comprises an inching pedal operably connected to one end of a shaft, an inching cam operably connected to the other end of said shaft for rotation therewith, a first cam follower supported by brackets extending from said hydraulic control, a yoke member rotatably mounted between said brackets and rotatable by said inching cam through said first cam follower, adjustment means on said first cam follower to vary the movement of said yoke member in response to movements of said inching cam, a connecting link connecting said yoke member to said brake rod and biasing means attached to said yoke member to bias said yoke member in a direction opposite to the direction of rotation effected by movement of said inching cam whereby said brake rod is moved axially into and out of said hydraulic control in response to movements of said inching pedal.

15. In an industrial truck having a hydrostatic transmission of the type described in claim 13 wherein said second means for actuating said brake rod comprises a braking pedal having a collar portion which is rotatably mounted on a first shaft, said first shaft non-rotatably secured to said truck at one end, said collar portion having an integral clevis extending therefrom, said clevis operably connected to a master brake cylinder by means of a brake pedal pin, said first shaft having its other end in juxtaposition to and in axial alignment with one end of a second shaft, said one end of said second shaft provided with a sleeve member that receives said other end of said first shaft, a lever member extending from said sleeve member and having a slot therein which receives the free end of said brake pedal pin, said brake pedal pin pivoting in response to rotation of said clevis portion and in turn effecting rotation of said lever member which transmits rotary motion to said second shaft, a braking cam operably connected to said second shaft for rotation therewith, a second cam follower supported by brackets extending from said hydraulic control, a yoke member rotatably mounted between said brackets and rotatable by said braking cam through said second cam follower, adjustment means on said second cam follower to vary the movement of said yoke member in response to movement of said inching cam, a connecting link connecting said yoke member to said brake rod and biasing means attached to said yoke member to bias said yoke member in a direction opposite to the direction of rotation effected by movement of said braking cam whereby said brake rod is moved axially into and out of said hydraulic control in response to movements of said inching pedal.

16. In an industrial truck having a hydrostatic transmission of the type described in claim 14 wherein said inching cam is provided with a cam angle which will produce relatively slow rotation of said cam follower whereby said brake rod is gradually moved into its position of dynamic braking.

17. In an industrial truck having a hydrostatic transmission of the type in claim 15 wherein said braking cam is provided with a cam angle which will produce rapid rotation of said cam follower whereby said brake rod is abruptly forced into braking position.

No references cited.

EDGAR W. GEOGHEGAN, *Primary Examiner.*

UNITED STATES PATENT OFFICE
CERTIFICATE OF CORRECTION

Patent No. 3,339,363            September 5, 1967

George F. Quayle

It is hereby certified that error appears in the above numbered patent requiring correction and that the said Letters Patent should read as corrected below.

Column 7, line 54, after "In" insert -- a --; column 9, line 1, after "mounted" insert -- to --.

Signed and sealed this 26th day of November 1968.

(SEAL)
Attest:

Edward M. Fletcher, Jr.
Attesting Officer

EDWARD J. BRENNI
Commissioner of Paten